United States Patent

Hasegawa et al.

[11] Patent Number: 5,144,128
[45] Date of Patent: Sep. 1, 1992

[54] SURFACE MICROSCOPE AND SURFACE MICROSCOPY

[75] Inventors: Tsuyoshi Hasegawa, Kokubunji; Sumio Hosaka, Tokyo; Shigeyuki Hosoki, Hachioji; Yukio Honda, Fuchu; Masakazu Ichikawa, Tokyo, all of Japan

[73] Assignee: Hitachi, Ltd., Tokyo, Japan

[21] Appl. No.: 649,898

[22] Filed: Feb. 1, 1991

[30] Foreign Application Priority Data

Feb. 5, 1990 [JP] Japan ................................ 2-24549
Feb. 7, 1990 [JP] Japan ................................ 2-26036

[51] Int. Cl.$^5$ ............................................. G01N 23/00
[52] U.S. Cl. ..................................... 250/306; 250/307
[58] Field of Search .................... 250/306, 307; 73/105

[56] References Cited

U.S. PATENT DOCUMENTS 4,798,989  1/1989  Miyazaki et al. .................... 310/328

FOREIGN PATENT DOCUMENTS 223918  6/1987  European Pat. Off. .
296871  12/1988  European Pat. Off. .

OTHER PUBLICATIONS

Albrecht et al., Journal of Applied Physics, No. 62 (1987), pp. 2599–2602.
Heingelmann et al., Journal of Vacuum Sciency Technology, A6 (1988), pp. 275–278.
Kirk et al., Rev. Sci. Instrum. 59(6), Jun. 1988, pp. 833–835.

Primary Examiner—Jack I. Berman
Attorney, Agent, or Firm—Fay, Sharpe, Beall, Fagan, Minnich & McKee

[57] ABSTRACT

An atomic force microscope is provided for sensing displacement of a cantilever based on scanning tunneling microscopy. The atomic force microscope includes a cantilever moving system which allows the cantilever to be moved or slipped between an STM tip and a sample. This results in the microscope being able to carry out atomic force microscopy and tunneling microscopy without changing a single STM tip and to control the very small force between the sample and the tip to be constant.

5 Claims, 9 Drawing Sheets

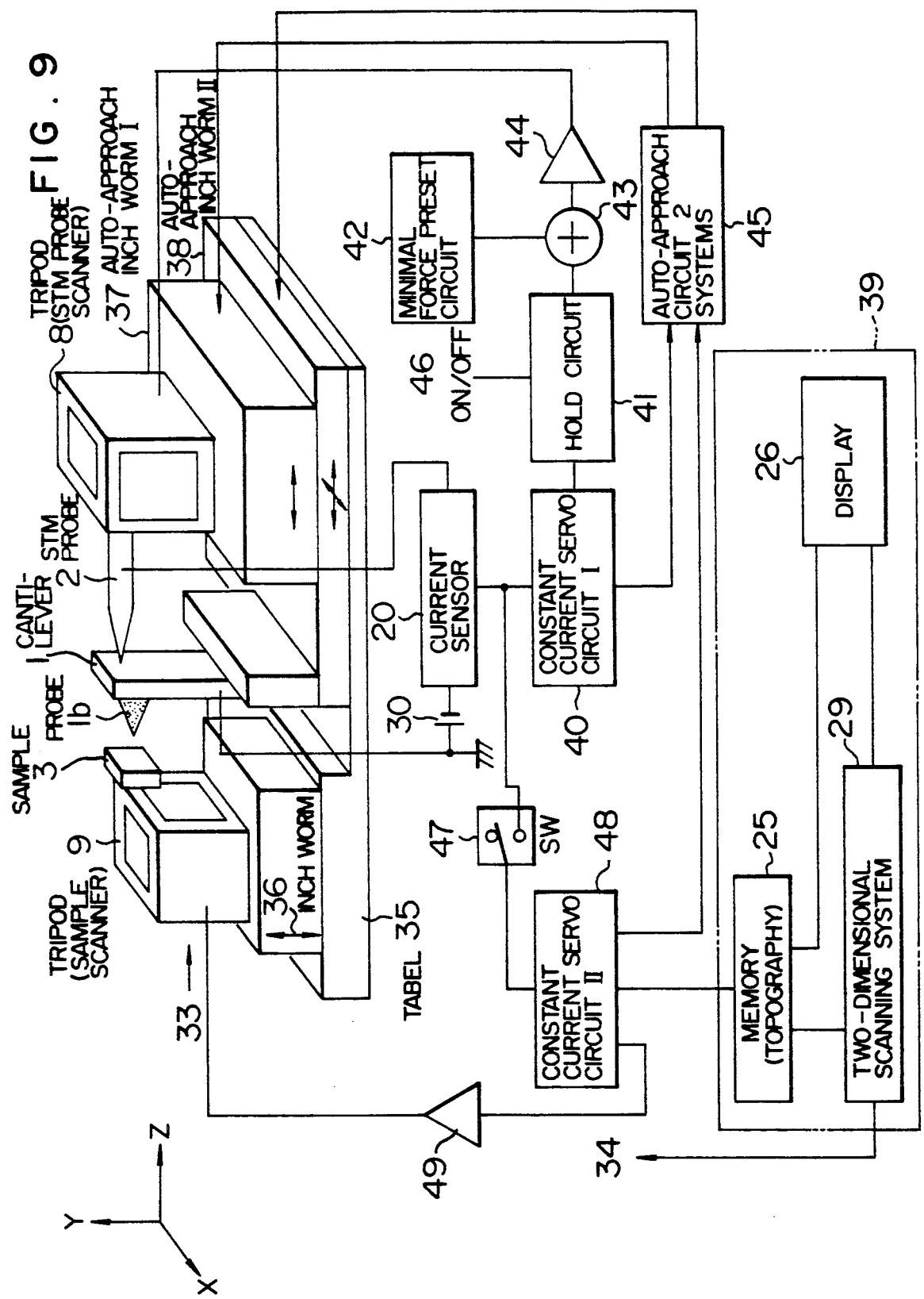

SURFACE MICROSCOPE AND SURFACE MICROSCOPY

BACKGROUND OF THE INVENTION

A traditional atomic force microscope designed to use tunneling microscopy for sensing displacement of a cantilever has been discussed in Journal of Applied Physics. 62 (1987), pp. 2599–2602, for instance. As a method for observing fine structures on a sample surface, there has been traditionally provided a method designed to sense displacement of a cantilever with a tunneling probing tip. The displacement of the cantilever results from a very small force (repulsion or attraction) exerted between a sample and a probing tip located at the tip of the cantilever. The method serves to keep the very small force constant by sensing the displacement of the cantilever with the tunneling tip. This method has been discussed in Journal of Vacuum Science Technology A6 (1988) pp. 275 to 278.

This method takes the steps of locating the cantilever between the probing tip of a tunneling microscope and a sample, locating the cantilever and the tunneling tip close to a tunneling region, locating the sample and the probing tip provided at the tip of the cantilever to an allowable region of sensing the atomic force, and scanning the sample in an X-Y plane. In carrying out the steps, with the tunneling tip, the method serves to sense the displacement of the cantilever resulting from the atomic force exerted between the sample and the probing tip provided at the tip of the cantilever, resulting in being able to obtain a three-dimensional image of a sample surface.

The sample, the cantilever and the tunneling tip are mounted to a piezoelectric device or a fine positioning system, which serves to adjust, control and scan the positions of those elements for the purpose of proper observation. The traditional method has made it possible to, when setting the system, remove the cantilever from the sample and the tunneling tip and to use the cantilever as a tunneling microscope for checking the performance of the piezoelectric device or the like, but it has made impossible the use of any other means except the atomic force microscope.

The foregoing prior art has merely offered a simple method such as atomic force microscopy or magnetic force microscopy.

The foregoing prior art includes the steps of sensing the displacement of the cantilever as tunneling current with the tunneling tip (referred to as an STM tip) located at the back of the cantilever, controlling the position of the sample toward the cantilever for keeping the tunneling current constant, and measuring surface topography or the like.

SUMMARY OF THE INVENTION

The concept of the present invention lies in the construction that a first microscope and a second microscope located above the first one are provided within the same chamber for observing a sample surface by properly handling the first and the second microscopes.

The present invention is also conceptually designed to use the position-sensing function of the second microscope for keeping a very small force exerted between a sample and a probing tip of the first microscope constant.

Concretely, the present invention comprises a first microscope having a cantilever for sensing atomic force or magnetic force and an STM (Scanning Tunneling Microscope) functioning as a second microscope for sensing tunneling current and for keeping the tunneling current constant. After setting a very small force exerted between the cantilever and the probing tip, the invention serves to feed back a displacement signal to a sample base for functioning as a switching current the tunneling current flowing between the cantilever of the atomic force microscope and the probing tip of the STM and keeping a distance between the cantilever and the probing tip constant.

The foregoing prior art does not have any discussion about how the magnitude of a very small force (repulsion or attraction) is set. A most important object of the surface microscope for keeping the very small force constant when observing the surface is to set and control a desired very small force value as accurately and stably as possible. Another object of the surface microscope is to obtain properties of an interface.

It is a first object of the present invention to provide a surface microscope which is capable of operating a first microscope and a second microscope provided within a chamber.

It is a second object of the present invention to provide a surface microscope which is capable of controlling a very small force value between the cantilever and the probing tip.

In carrying out the foregoing objects in a preferred mode, the present invention provides a moving system for the cantilever which allows the cantilever to be located between the tunneling tip and the sample or to be slipped to such a proper position as to locate the tunneling tip closer to the sample. The moving system is designed to have a movement of several millimeters to several tens of millimeters, with sub-micron or better positioning accuracy. The moving system provides two or more cantilevers mounted thereon in a manner that these cantilevers do not pose an obstacle to each other in operating the tunneling microscope.

When the cantilever moving system is served as an atomic force microscope (or magnetic force microscope), the cantilever moving system serves to locate the cantilever between the tunneling tip and the sample so as to arrange such relation of the sample, the cantilever and the tunneling tip as to realize the atomic force microscopy (or magnetic force microscopy). When serving as a tunneling microscope, the cantilever moving system serves to slip the cantilever out from between the sample and the tunneling tip as the tunneling tip is coming closer to the sample, for the purpose of carrying out the tunneling microscopy. With one tunneling tip, therefore, it is possible to select any one of the atomic force microscopy, the magnetic microscopy and the tunneling microscopy. The surface microscope according to the invention is thus capable of applying three microscopes to the same sample in the same cantilever moving system, thereby being able to obtain more sample information. With the cantilever moving system being controlled from a remote place, the cantilever is further allowed to be easily moved in a vacuum without breaking the vacuum state.

In order to carry out the foregoing object, the surface microsccpe of the invention comprises an autoapproach system for the cantilever and the STM tip, a control system for keeping a positional relationship between the cantilever and the STM tip constant, an STM tip holding system, an STM tip retreating system for setting a desired very small force value, an auto-approach system for the sample and the tip located at the tip of the cantilever, a system for controlling the position of either one of the sample and the cantilever and the STM tip combined with each other, a tip located at the tip of the cantilever and composed of a magnetic material, said tip being coated with a conductive film if necessary, and a system for measuring an insulating film thickness, an electron state and a tunnel barrier existing on the sample surface based on a tunneling current flowing between the probing tip and the sample.

In operation, the auto-approach system for the cantilever and the STM tip is used for sensing the position of the cantilever when no force is exerted on it (free condition). The control system serves to keep the tunneling current flowing between the STM tip and the cantilever constant. The tunneling current has to be constant for accurately sensing the position with a piezoelectric device. This is because it is necessary to continue the position sensing during a desired waiting time until creep of the piezoelectric device and thermal drift of the sample are made stable. The STM tip holding system and the STM tip retreating system for setting a desired minimal force value serve to stop the operation of sensing the position of the cantilever, hold the STM tip at the position, withdraw the STM tip by a desired distance, and secure it. The retreating or withdrawing distance corresponds to a setting variation of the cantilever. The setting very small force can be defined by a spring constant of the cantilever. The auto-approach system for the sample and the tip located at the tip of the cantilever and the system for controlling the position of either one of the sample and the combination of the cantilever and the STM tip serve to move either one closer to the other one and to control the position between both so as to keep the tunneling current flowing between the cantilever and the STM tip at a desired value. This results in allowing the sample and the probing tip located at the tip of the cantilever to come closer to each other and in controlling the tunneling current value, that is, the very small force value to be constant, thereby enabling the probing tip to sense the sample surface. Under the constant tunneling current, by raster-scanning either one of the sample and the probing tip located at the tip of the cantilever, it is possible to measure the surface topography with the same STM method.

For the purpose of knowing how a sample made of a magnetic material is magnetized, it is necessary to compose the tip located at the tip of the cantilever from the magnetic material, or to coat the tip with the conductive film. That is, the repulsive force is measured as convex and the attractive force is measured as concave.

For a sample having an insulating film coated on the surface, the magnitude of the tunneling current flowing between the probing tip located at tip of the cantilever and the sample depends on the thickness of the insulating film and an interface between the sample and the insulating film. Hence, it is possible to measure a thickness of the insulating film and properties of interface between the sample and the insulating film based on the change of the tunneling current.

BRIEF DESCRIPTION OF THE DRAWINGS

FIG. 9 is a view showing a concrete arrangement of the surface microscope for realizing the operating sequence shown in FIG. 8A;

DESCRIPTION OF THE PREFERRED EMBODIMENTS

Hereafter, an embodiment of the invention will be described with reference to FIG. 1.

Figure 1:
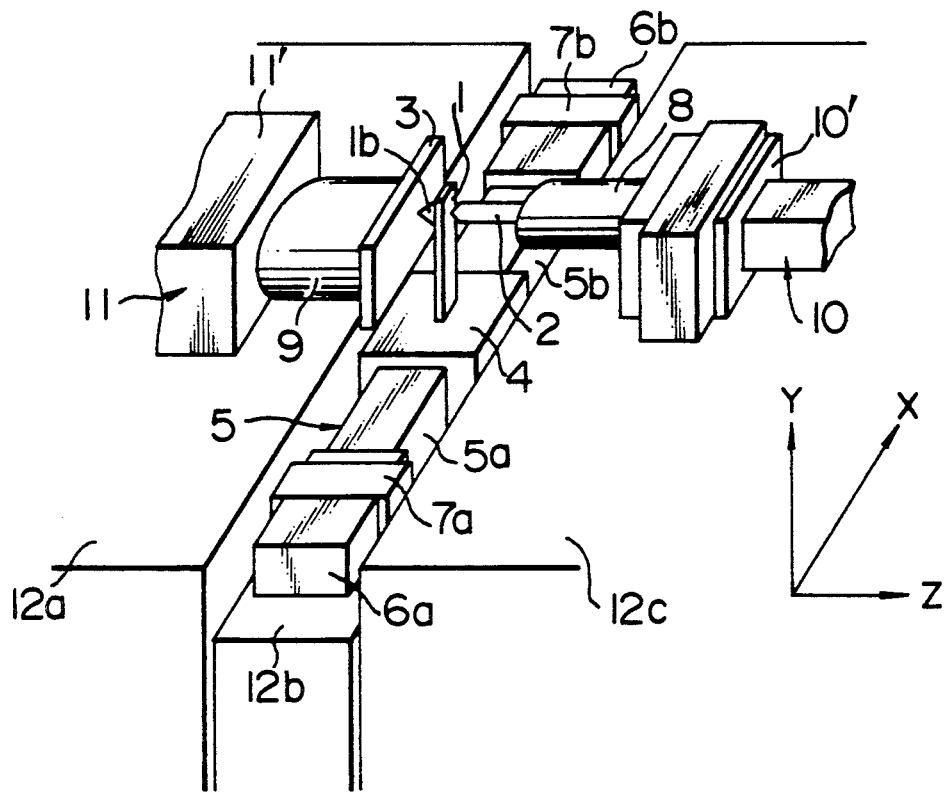
FIG. 1 is a perspective view showing an essential portion of a microscope according to an embodiment of the invention.

FIG. 1 is a perspective view showing an essential portion of a scan type microscope including a cantilever moving system. FIG. 1 shows a cantilever having a probing, tip 1$b$. The cantilever 1 is mounted on the cantilever moving system 5 through a lever base 4. The cantilever moving system 5 employs an inchworm structure for obtaining a large range of movement while keeping submicron or better positioning accuracy. As shown, the cantilever moving system 5 includes the lever base 4, piezoelectric devices 5$a$, 5$b$, terminals 6$a$, 6$b$, and clamps 7$a$, 7$b$.

A tunneling tip 2 is located above a stage 12$b$. The tunneling tip 2 is mounted to a scanner 8 composed of piezoelectric devices. The scanner is mounted onto a coarse moving system 10 including the elements numbered 10 and greater. The tunneling tip side unit is located on a stage 12$c$.

A sample 3 is mounted onto a scanner 9 composed of piezoelectric devices. The scanner 9 is mounted onto a coarse moving system 11 including the elements numbered 11' and greater. The sample side unit is located on a stage 12$a$. Both of the stages 12$a$ and 12$c$ are allowed to move relatively with respect to the X and the Y directions. The stages 12$a$ and 12$c$ thus help to select a desired spot of the sample and arrange the relative positional relation among the sample 3, the cantilever 1 and the tunneling tip 2 in concert with the coarse moving systems 10 and 11. The cantilever moving system 5 is allowed to move in the X direction by opening or closing the clamps 7$a$, 7$b$ and expanding or shrinking the piezoelectric devices 5$a$, 5$b$.

In case of carrying out the atomic force microscopy, the cantilever 1 travels in a manner to allow itself to locate just between the tunneling tip 2 and the sample 3. Then, with the coarse moving systems 10 and 11, the distance between the tunneling tip 2 and the cantilever 1 and between the sample 3 and the cantilever 1 are reduced in a manner to allow the atomic force microscopy to be carried out.

In case of carrying out the tunneling microscopy, with the cantilever moving system 5, the cantilever 1 retreats to such a region as allowing the tunneling tip 2 to smoothly come closer to the sample 3. The control and scanning of the position of the tunneling tip 2 and the sample 3 are carried out by the scanner 8 and 9 composed of piezoelectric devices. This results in being able to obtain a scanning microscope image.

Figure 2:
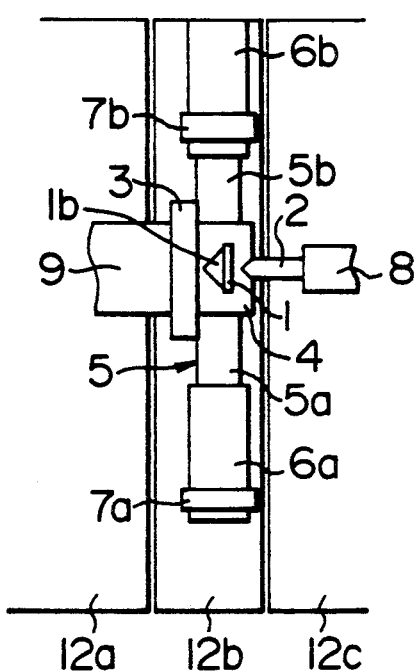
FIG. 2 is a top view showing the essential portion of the microscope in carrying out atomic force microscopy.

FIG. 2 is a top view showing the essential portion of the microscope shown in FIG. 1 for the case of carrying out atomic force microscopy. The cantilever 1 is provided between the tunneling tip 2 and the sample 3. By flowing current between the tunneling tip 2 and the cantilever 1, according to tunneling microscopy, it is possible to measure how the cantilever 1 is displaced to control the Z-axis position of the sample 3 in a manner to keep the displacement of the cantilever 1 constant through a feedback circuit.

Figure 7:
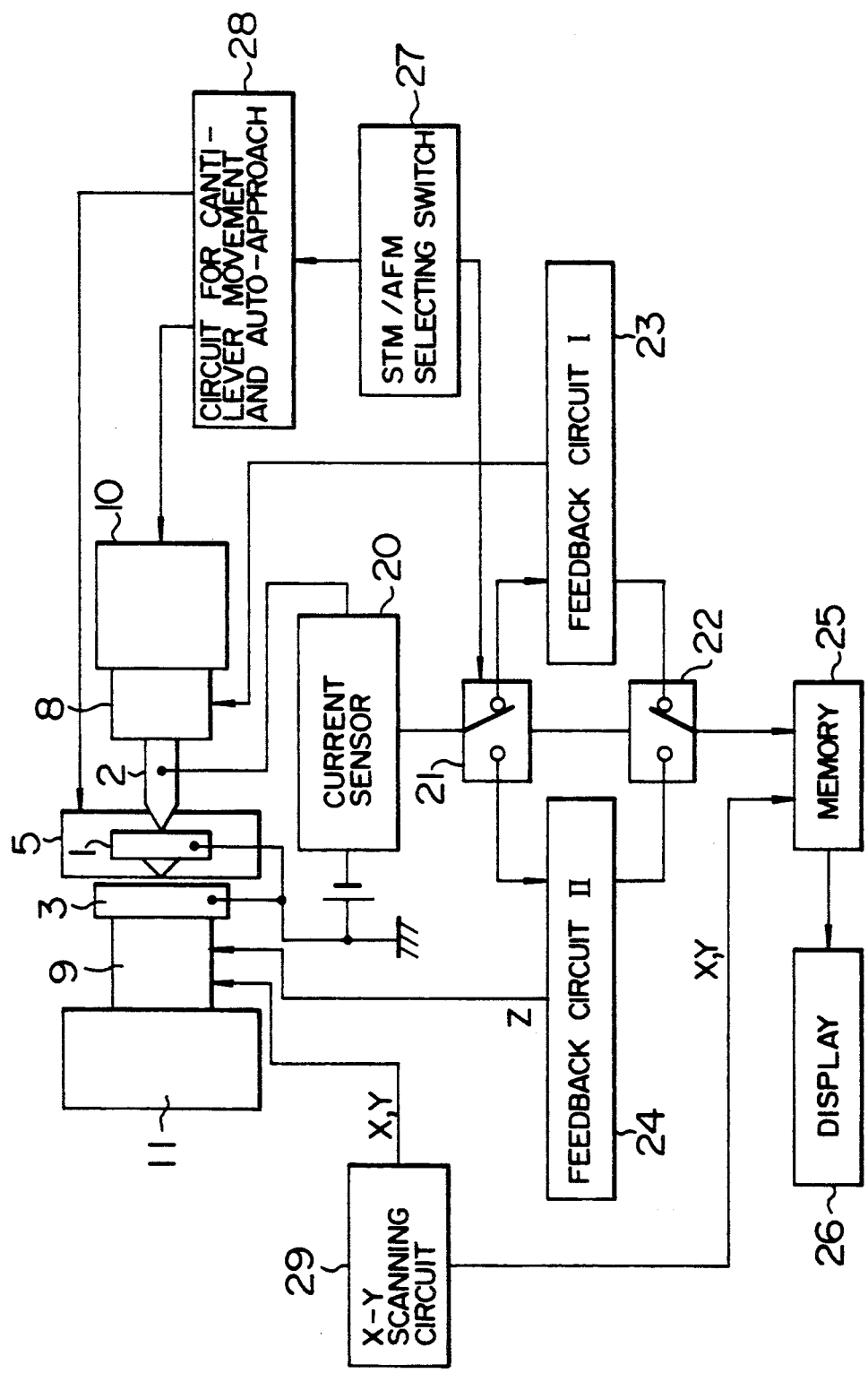
FIG. 7 is a block diagram schematically showing a control circuit for a microscope according to the invention.

FIG. 7 is a block diagram showing an essential circuit included in the microscope. The following description will be directed to atomic force microscopy and then to tunneling microscopy.

In FIG. 7, a current sensor 20 senses current flowing between the probing tip 2 and the cantilever 1. In order to measure the displacement of the cantilever, the switches 21 and 22 are thrown to the side of a feedback circuit I 23 as shown in FIG. 7. Then, the scanner 8 serves to move the tip 2 in the Z-axis direction in a manner to keep the tunneling current constant, that is, to maintain the constant interval between the tip 2 and the cantilever 1. The scanner 9 and an X-Y scanning circuit 29 serve to scan the material on the X-Y plane. The displacement of the cantilever 1 corresponds to that of the tip 2, which is sent to a memory 25 together with an X-Y scanning signal. This results in allowing a display 26 to represent a concave and convex image on the surface of the sample 3. In order to keep the displacement of the cantilever 1 constant, the switches 21 and 22 are thrown to the opposite side as that shown in FIG. 7 so that the tip 2 is made fixed. A feedback circuit II 24 serves to control the Z-axis position of the sample 3 so as to keep the current flowing between the tip 2 and the cantilever 1 constant, that is, to keep the displacement of the cantilever 1 constant. The Z-axis control signal given by the feedback circuit II 24 is represented as a convex and concave image on the surface of the sample 3 on the display 26.

Figure 3:
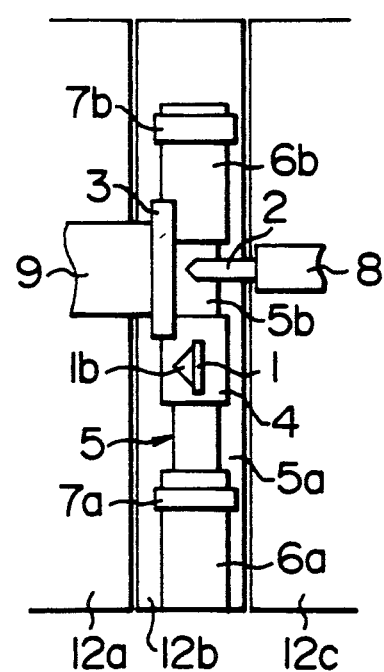
FIG. 3 is a top view showing the essential portion of the microscope in carrying out tunneling microscopy.

FIG. 3 is a top view showing an essential portion of the scanning microscope prepared for carrying out the tunneling microscopy. The cantilever 1 is moved backward to a point where the cantilever 1 itself does not obstruct the approaching operation of the tunneling tip 2 to the sample 3. The tunneling tip 2 comes closer to the sample 3 so that the tunneling current is allowed to flow through the sample 3.

Figure 8A:
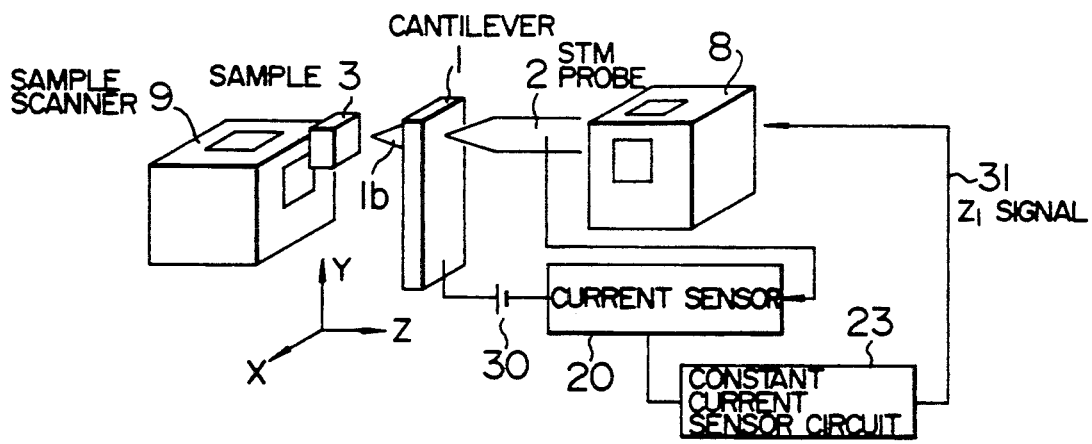
FIGS. 8A to 8D are views showing a basic construction of a surface microscope according to the invention, and the operating sequences of the surface microscope.

FIGS. 8A to 8D show basic operating sequences of a surface microscope according to the invention. In FIG. 8A, the cantilever 1 stays in the free condition. The current sensor 20 serves to sense the tunneling current flowing between the cantilever 1 and the STM tip 2 as a result of a bias voltage 30 applied therebetween. At the same time, the current sensor 20 serves to drive a Z-axis piezoelectric device of the scanner 8 through the STM constant current servo circuit 23 so as to allow the STM tip 2 to come closer to the cantilever 1 until the tip 2 reaches a tunneling region. When the tip 2 reaches the tunneling region, the tunneling current flows between the tip 2 and the cantilever 1. The constant current servo circuit 23 serves to compare the tunneling current value with a reference value, supply a signal ($Z_1$ signal) for driving the Z-axis piezoelectric device of the scanner 8, and to control the Z-axis position of the tip 2 so as to keep the tunneling current constant. After stabilizing the overall system in the constant tunneling current, the tip 2 is temporarily held.

Figure 8B:
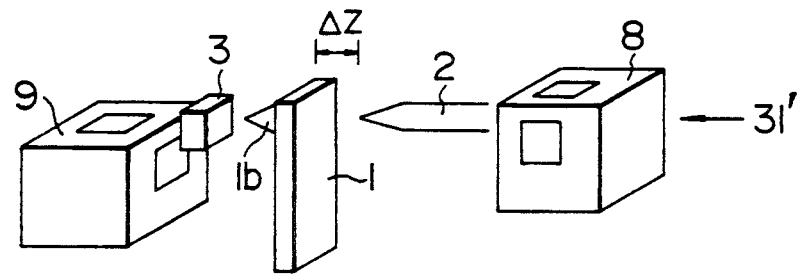

Then, as shown in FIG. 8B, for setting the very small force (displacement of the cantilever) to a predetermined value, a predetermined driving signal 31' is supplied to the Z-axis piezoelectric device of the scanner 8. The tip 2 is moved backward in the Z-axis direction by a predetermined distance $\Delta Z$ from the position at which the tip 2 is held. The tip 2 is held at the position again. These operations allow a desired very small force value to be preset.

Figure 8C:
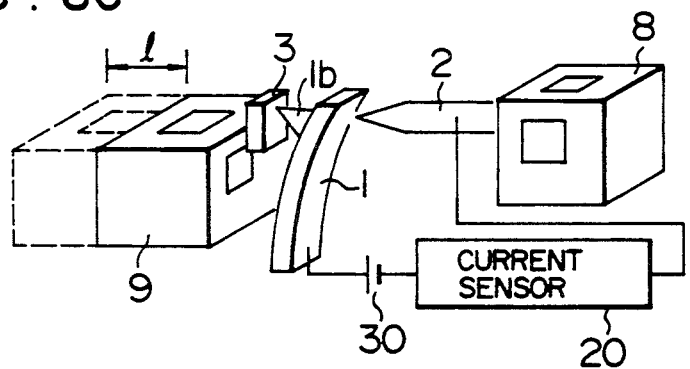
Figure 8D:
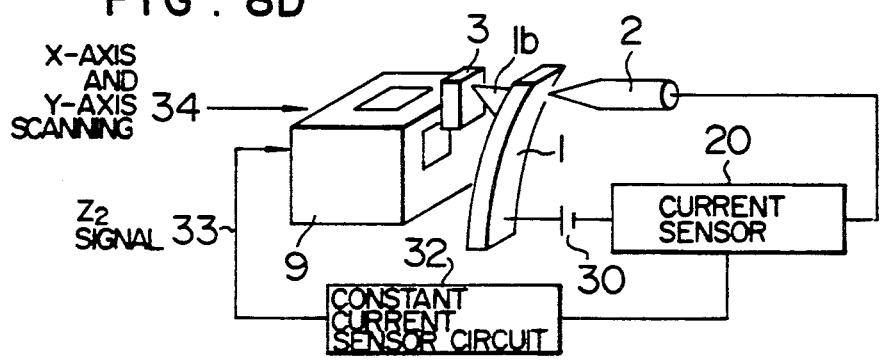

Next, as shown in FIG. 8C, the sample 3 is pushed against the tip 1b located at the tip of the cantilever 1 until the tunneling current flows through the tip 2 again. At this time, the tip 2 serves as a mechanically-positioned electric switch. When the tunneling current starts to flow through the tip 2 again, as shown in FIG. 8D, in response to a signal ($Z_2$ signal) sent from the constant current servo circuit 32, the Z-axis piezoelectric device of the tripod type scanner 9 supporting the sample is driven to control the Z-axis position of the sample to keep the tunneling current constant (the same constant value as that set in the state shown in FIG. 8A). In this state, the X- and Y-axis piezoelectric devices of the sample scanner 9 serve to drive the sample in the X-Y plane so that the probing tip 1b located at the tip of the cantilever 1 is allowed to raster-scan on the sample surface. This results in capability to obtain the surface topography of the sample provided when the tunneling current keeps a predetermined very small force value.

A coarse moving system for the STM tip 2 and the sample 3 may also be provided, although such is not shown in FIGS. 8A to 8D. Further, the cantilever 1 and the STM tip are moved closer to the sample 3 in concert by the coarse moving system, while maintaining the predetermined positional relationship between them. Or, it may be possible to carry out the X-Y raster scanning and the servo operation done on the constant very small force value using the combination of the cantilever 1 and the STM tip 2, without departing from the spirit of the invention.

FIG. 9 is a block diagram showing a concrete arrangement of the surface microscope for realizing the operating sequences shown in FIGS. 8A to 8D. An inchworm 36 for supporting a sample scanner 9, and auto-approach inchworms I 37 and II 38, are provided on a table 35 and serve as a coarse moving system. On the inchworm II 38 are provided a cantilever 1, an STM tip scanner 8 and an STM tip 2. The inchworms I 37 and II 38 serve to execute the operating sequences shown in FIGS. 8A to 8C. The control system includes a control system for presetting a desired very small force, a control system for servo-controlling a desired very small force, and a system 39 for obtaining surface topography. The very small force presetting control system comprises a constant current servo circuit I 40, a hold circuit 41, a minimal force presetting circuit 42, an adding circuit 43, a high-voltage amplifier 44, and an auto-approach circuit 45.

When the operation shown in FIG. 8A is carried out, the hold circuit 41 is set to an off mode in response to a signal 46 for setting whether or not any voltage is held. Then, the auto-approach circuit 45 serves to drive the inchworm I 37 so that the STM tip 2 is allowed to come closer to the cantilever 1 staying in the free condition. At the same time, the inchworm I 37 serves to servo-control the Z-axis position of the STM tip 2 in a manner to keep the tunneling current flowing between the STM tip 2 and the cantilever 1 constant. When a certain amount of tunneling current flows between the STM tip 2 and the cantilever 1, the servo-control system serves to slowly move a tripod 8 to push the STM tip 2 against the cantilever 1. The constant current servo circuit I 40 slowly changes its output from a maximum voltage to a predetermined one for the purpose of controlling the inchworm I depending on the changing output. The control of the inchworm I results in realizing the state shown in FIG. 8A.

The operating mode shown in FIG. 8B is carried out as follows. The hold circuit 41 is set to an on mode in response to an on/off signal 46 for the hold circuit 41 so that the hold circuit can fix a servo voltage. An adding circuit 43 serves to add the fixed servo voltage to a predetermined voltage preset by the very small force presetting circuit 42. The addition allows the STM tip 2 to be moved backward by a predetermined distance $\Delta Z$ so that the force exerted between the sample 3 and the tip 1b located on the cantilever 1 is allowed to be set as a repulsive force ($k\Delta Z$), where k is a spring constant of the cantilever 1 and is preferably about 1 N/m. Assuming that $\Delta Z$ is 10 nm, for instance, the set very small force (repulsive force) is $10^{-8}$N. Herein, for setting the predetermined very small force, the Z-axis piezoelectric device of the tripod 8 is moved backward. As another means, however, it may be possible to employ a retreating function of the auto-approach inchworm I. That is, the tip may be moved backward only by $\Delta Z$ using the piezoelectric device for driving the inchworm I 37 in the Z-axis direction.

In the foregoing state, a switch 47 is turned on so that the current sensor 20 supplies a current output to the constant current servo circuit II 48 for operating the constant current servo system. The auto-approach circuit 45 serves to drive the auto-approach inchworm II 38 in a manner to preset a variation of AZ corresponding to a predetermined very small force between the STM tip 2 and the cantilever 1. In the variation preset state, the probing tip 1b located at the tip of the cantilever 1 is allowed to come closer to the sample 3. When the tip 1b receives repulsive force off the sample 3, the cantilever 1 is flexed toward the STM tip 2, thereby allowing the tunneling current to flow between the cantilever 1 and the STM tip 2. Then, as the piezoelectric device for driving the inchworm II 38 is expanded, the piezoelectric device for Z-control of the sample scanner 8 slowly reduces the expansion to a proper value so that the sample scanner 4 can obtain the surface topography of the sample. At this time, the constant current servo circuit II 48 and the high voltage amplifier 49 are constantly operative so that they control the Z-axis position of the sample 3 for keeping the tunneling current value constant. With the foregoing methods, the operations shown in FIGS. 8C to 8D are realized.

Moreover, the surface topography can be obtained by the surface topography obtaining system 39 having a memory 25, a two-dimensional scanning system 29 and a display 26. In operation, the two-dimensional scanning system 29 supplies a signal 34 for driving the X- and Y-axis piezoelectric devices of the sample scanner 9. With the piezoelectric devices being driven, the probing tip 1b is allowed to relatively raster-scan on the sample surface. The constant current servo circuit II 48 thus changes its output signal depending on the convex and concave images formed on the sample surface. Thus, the output signal represents the convex and concave information corresponding to the X and Y scanning signal. The output signal is stored in the memory 25 for the purpose of obtaining the topographic structure. After obtaining the topographic structure, the topographic structure is read out of the memory 25 and is sent to the display 26 on which a three-dimensional image is displayed of the topographic structure.

As mentioned above, the present invention provide a highly accurate and reliable repulsive type atomic force microscope. A more excellent microscope system can be realized by using a computer for controlling the aforementioned procedures. The foregoing description has been concerned with the repulsive type atomic force microscope. By providing the STM tip 2 in opposite relation to the tip 1b of the cantilever 1 (sample 3), however, the embodiment may apply to the attractive force.

Figure 10:
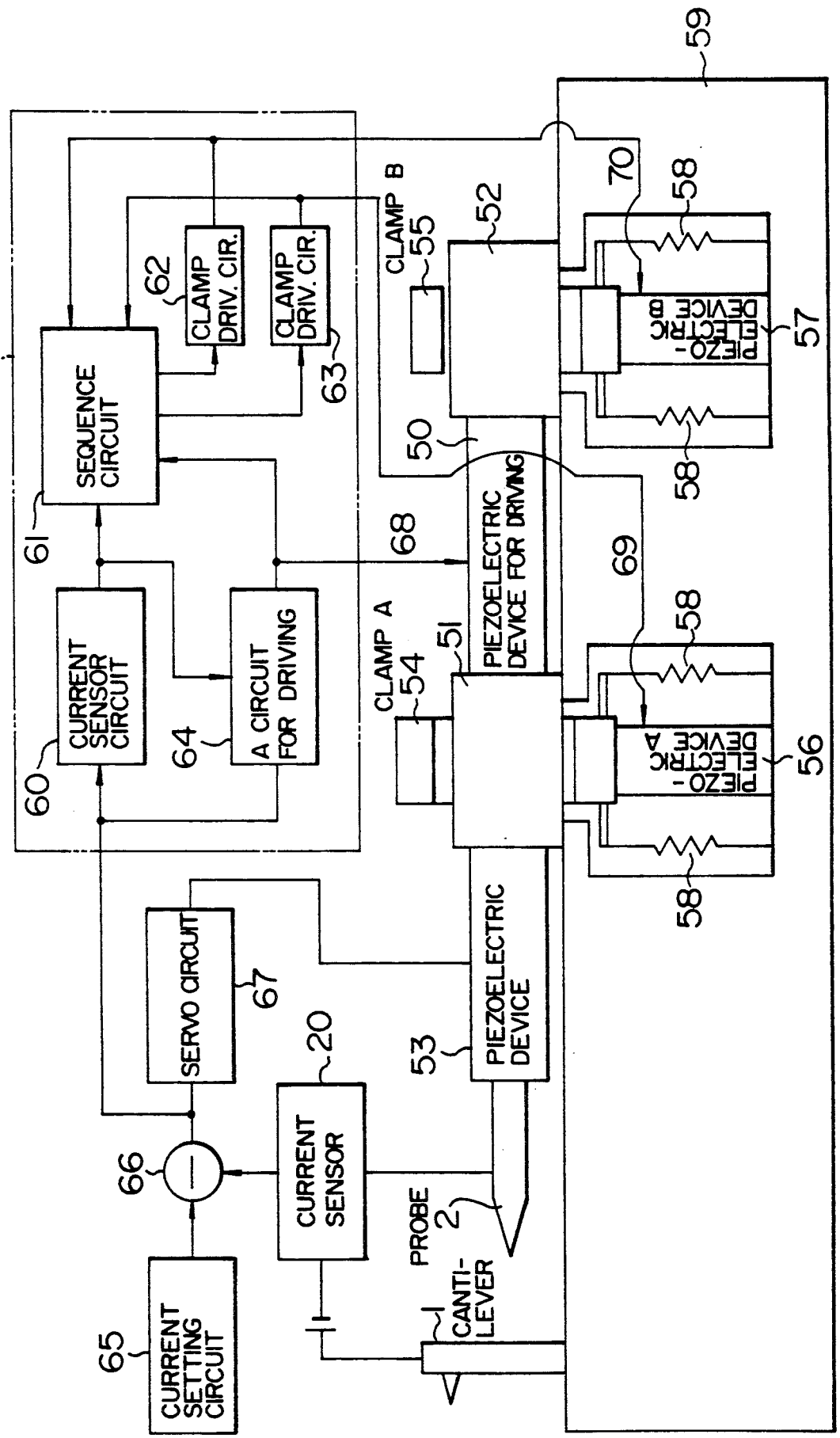
FIG. 10 is a view showing an auto-approach circuit and concrete arrangement of an inchworm.

FIG. 10 shows a concrete arrangement of the auto-approach circuit and the inchworm. The inchworm has a moving part and a clamp part. The moving part includes a piezoelectric device 50, and terminals 51, 52 connected on both ends of the piezoelectric device 50. The moving part serves to move the STM tip 2 and the piezoelectric device for Z-control in front of the terminal 51. The clamp part includes clamps A 54 and B 55 located in a manner to wrap the terminals 51 and 52, piezoelectric devices 56, 57 for supporting the clamps, and a pulling spring 58.

The clamp part is operated by applying a voltage to the piezoelectric devices 56 and 57. When the applied voltage is 0 V, the piezoelectric devices 56, 57 are prevented from expanding. Hence, the pulling spring 58 serves to pull the clamps A and B downwardly so that the terminals 51, 52 are allowed to be pushed against the top of a table 59, resulting in entering the terminals 51, 52 into a clamping state. When the applied voltage is 100 V, the piezoelectric devices 56, 57 are allowed to expand so that the clamps A and B are pushed upwardly against the force of the spring, thereby releasing the terminals 51, 52 out of the clamping state. In FIG. 10, the clamp B side denotes a clamping state and the clamp A side denotes a clamp-releasing state.

The auto-approach circuit 45 (only one system of which is shown in FIG. 10) includes a current sensor circuit 60, a driving circuit 64 for the piezoelectric devices, a sequence circuit 61, and clamp driving circuits 62, 63. In particular, in the auto-approaching operation, the driving circuit 64 serves to guide the STM tip 2 toward the cantilever 1 at a constant speed in order to avoid a collision between the STM tip 2 and the cantilever 1. The driving circuit 64 has another function of decreasing the approach speed when the tip 2 reaches the tunneling region for preventing the collision. That is, the driving circuit 64 is controlled by an error signal produced between the tunneling current value and the current value set by the current setting circuit 65. Preferably, the driving circuit 64 is composed of a mirror integrator.

The constant current servo circuit for keeping the tunneling current constant includes a current setting circuit 65, a current error sensing circuit 66, and a servo circuit 67. The constant current servo circuit functions in the same manner as that shown in FIG. 9. It serves to control the Z-axis position of the tip through the effect of the piezoelectric device 53 so as to keep the tunneling current at the constant value set by the current setting circuit 65.

Figure 11A:
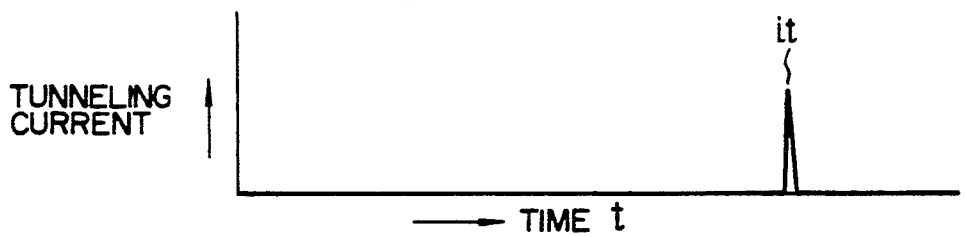
FIGS. 11A to 11E are explanatory graphs showing the operating sequences of the auto-approach system.
Figure 11B:
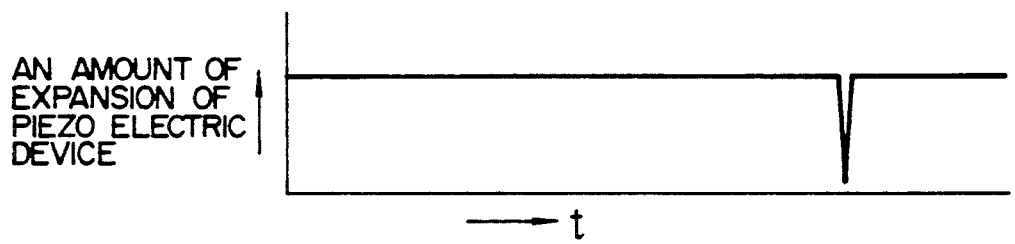
Figure 11C:
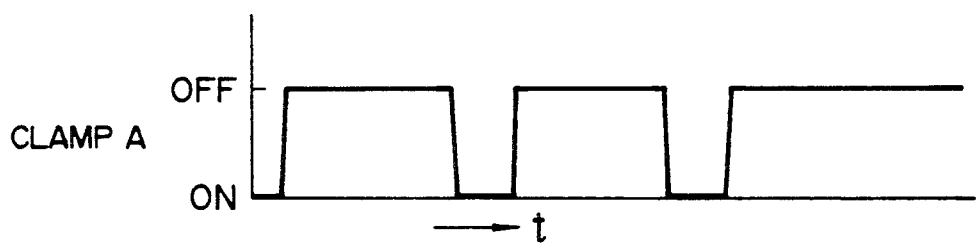
Figure 11D:
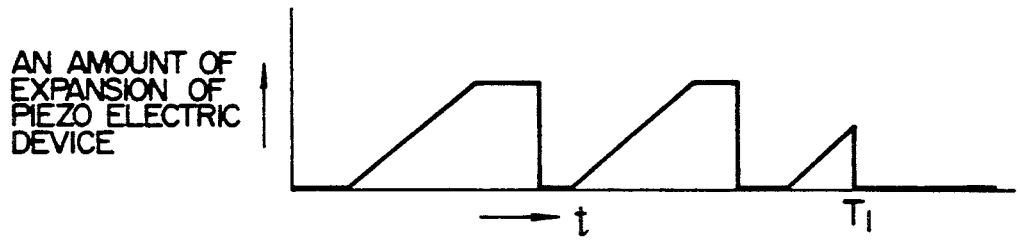
Figure 11E:
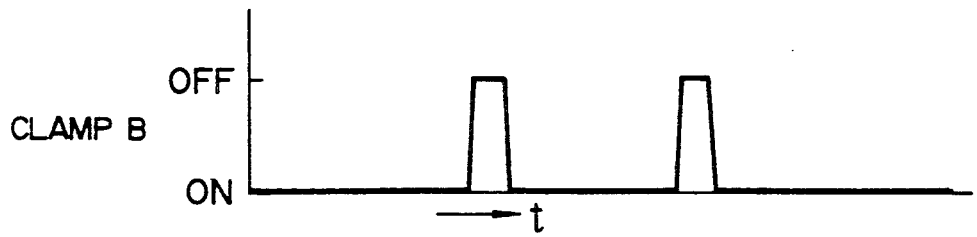

FIGS. 11A to 11E show how some elements are operated in the auto-approach circuit 45 before the tip 2 reaches a tunneling region. FIG. 11A shows the operation of the tunneling current, FIG. 11B shows an amount of expansion of the piezoelectric device 53, FIG. 11C shows the operation of the clamp A 54, FIG. 11D shows an amount of expansion of the piezoelectric device 50, and FIG. 11E shows the operation of the clamp B 55.

In case the cantilever 1 is far apart from the tip 2, no tunneling current flows between the cantilever 1 and the tip 2 (see FIG. 11A) and the piezoelectric device 53 is expanded to a maximum point (see FIG. 11B). In the first state, the voltage of 0 V is applied to all of the piezoelectric devices 50, 56, 57 of the inchworm, the clamps 54, 55 are clamped, and the piezoelectric device 50 has zero expansion. From this state, the following operations are carried out.

At first, the clamp 54 is pushed upward so that it is released out of the clamping state (off state) (see FIG. 11C). The piezoelectric device 50 is started to expand at a constant speed (see FIG. 11D). In case the tip 2 does not reach the tunneling region until the amount of expansion reaches a maximum, the expansion of the piezoelectric device 50 stops at the maximum value. At the state, the clamp A 54 is clamped (on state) and the clamp B 55 is released out of the clamping state (off state) (see FIG. 11E). Then, the piezoelectric element 50 is started to shrink. Again, the clamp B55 is clamped (on state).

The above-mentioned process corresponds to the action of a one-step advance of the tip 2. The tip 2 is allowed to move forward until the tunneling current starts to flow between the tip 2 and the cantilever 1 by repeating the process. As shown in FIG. 11D, when the piezoelectric device 50 is being expanded (time $T_1$), the tip 2 is moving forward against the cantilever 1 and may reach the tunneling region. In this case, as shown in FIG. 11A, the tunneling current $i_t$ starts to flow between the tip 2 and the cantilever 1 and the piezoelectric device 53 accordingly starts to shrink for the purpose of keeping the tunneling current constant (see FIG. 11B). The shrinkage of the piezoelectric device 53 enables avoidance of a collision between the tip 2 and the cantilever 1. At The same time, the piezoelectric element 50 is servo-operated so that it is shrunk to an original state (see FIG. 11D). At this time, it is preferable to leave the clamp A 54 out of the clamping state (off state). This is because the tip 2 may slightly slip and to collide with the cantilever 1 when the clamp A is clamped.

From this state, the piezoelectric device 53 is gradually expanded and the expansion of the piezoelectric device 50 is arranged so that the output of the servo circuit 67 reaches any voltage value in a dynamic range. The foregoing operation allows the operation shown in FIG. 8A to be realized. The present embodiment has employed the inchworm, but a motor or a mechanical shrinking system may be employed for the auto-approach operation.

Figure 12:
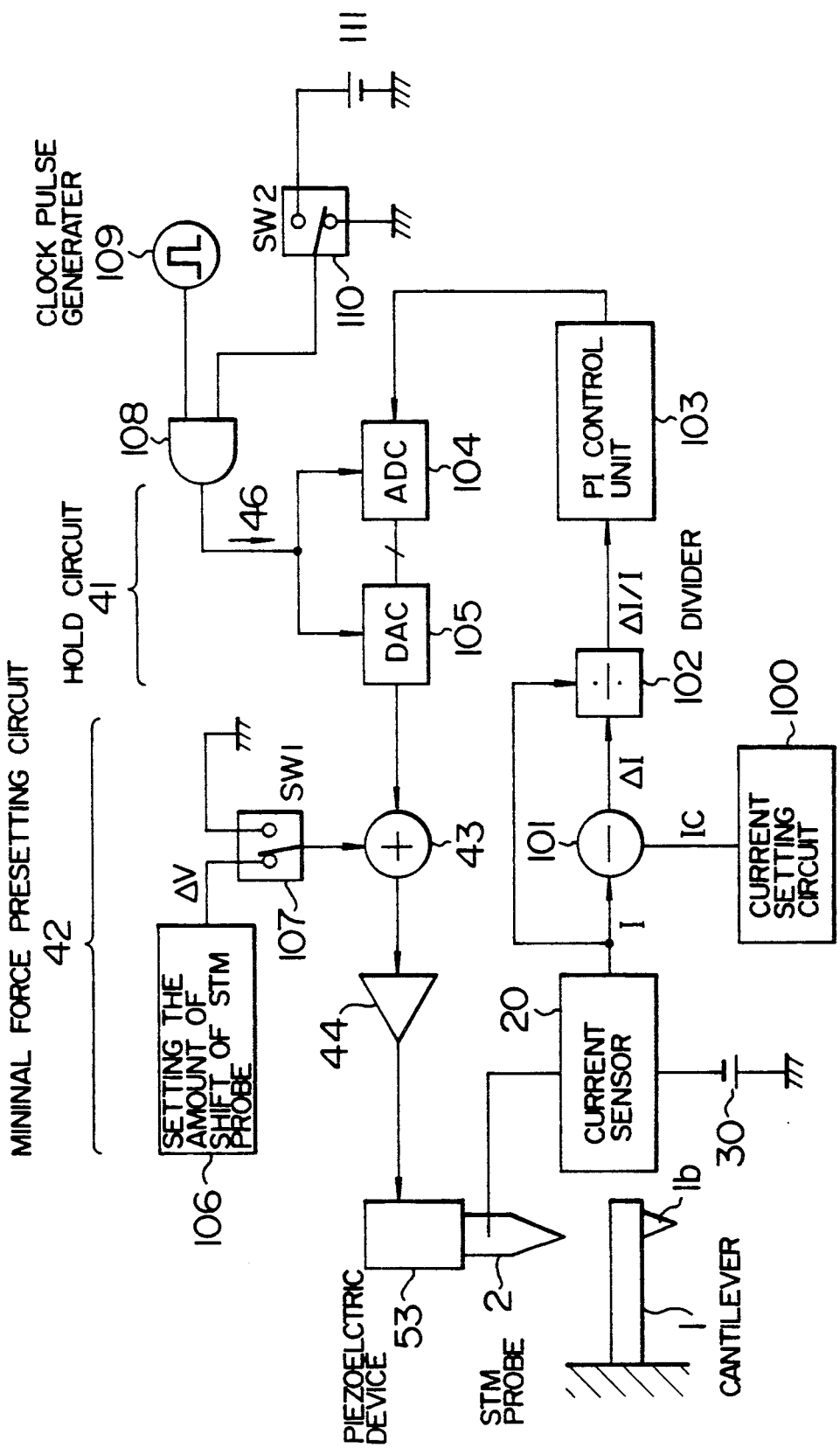
FIG. 12 is a block diagram showing a concrete arrangement of the surface microscope for realizing the operation shown in FIG. 8B.

FIG. 12 is a concrete arrangement of the circuit for realizing the operation shown in FIG. 8B. As shown, the arrangement includes a constant current servo circuit 40, a hold circuit 41, and a very small force presetting circuit 42. The constant current servo circuit 40 serves to control the Z-axis position of the STM tip 2 so that a subtracting circuit 101 senses an error current $\Delta I$ ($= I_c - I$) between a sensed value I of the tunneling current and a predetermined tunneling current value $I_c$, a dividing circuit 102 senses an error $\Delta G$ ($\sim \Delta I/I$) of the tunnel gap, and a PI control section 103 reduces $\Delta G$ to zero. The hold circuit 41 employs the combination of an analog-to-digital converter (ADC) 104 and a digital-to-analog converter (DAC) 105 which keeps a stable state for a long time and holds an analog voltage accurately. This means that the hold circuit 41 is essentially required to control a conversion control signal 46, because a digital signal is temporarily produced.

Herein, a clock pulse generator 109 generates a clock pulse and a switch 110 controls a gate circuit 108 for the purpose of producing a signal 46 for selecting a hold state or a servo state. In FIG. 12, the hold state is selected. The servo state is executed by turning the switch 110 to the positive voltage power 111. Concretely, it is preferable to set a clock-pulse frequency to 100 kHz or more and to provide the bit number of the DAC and ADC of 12 bits or more in light of the accuracy and resolution.

Next, the very small force presetting circuit 42 includes an STM tip shifting amount setting circuit 106, a switch 107 and an adding circuit 43. The STM tip shifting amount setting circuit 106 is composed of a simple variable d.c. voltage source and serves to supply a preset voltage $\Delta V$ to the piezoelectric device 53 through the high-voltage amplifier 44 so that the STM tip 2 is moved backward by the distance $\Delta Z$ from the holding position where the tunneling current I is equal to the predetermined value $I_c$. In order to set the repulsive force exerted between the tip 1b located at the tip of the cantilever 1 and the sample to a predetermined very small force value, it is only necessary to arrange the present voltage $\Delta V$. For applying the preset voltage $\Delta V$, it is necessary to take the steps of turning the switch 110 to the state shown in FIG. 12, holding the servo system, and then turning the switch 107 to the state shown in FIG. 12. This results in the realization of a desired preset very small force.

Figure 13:
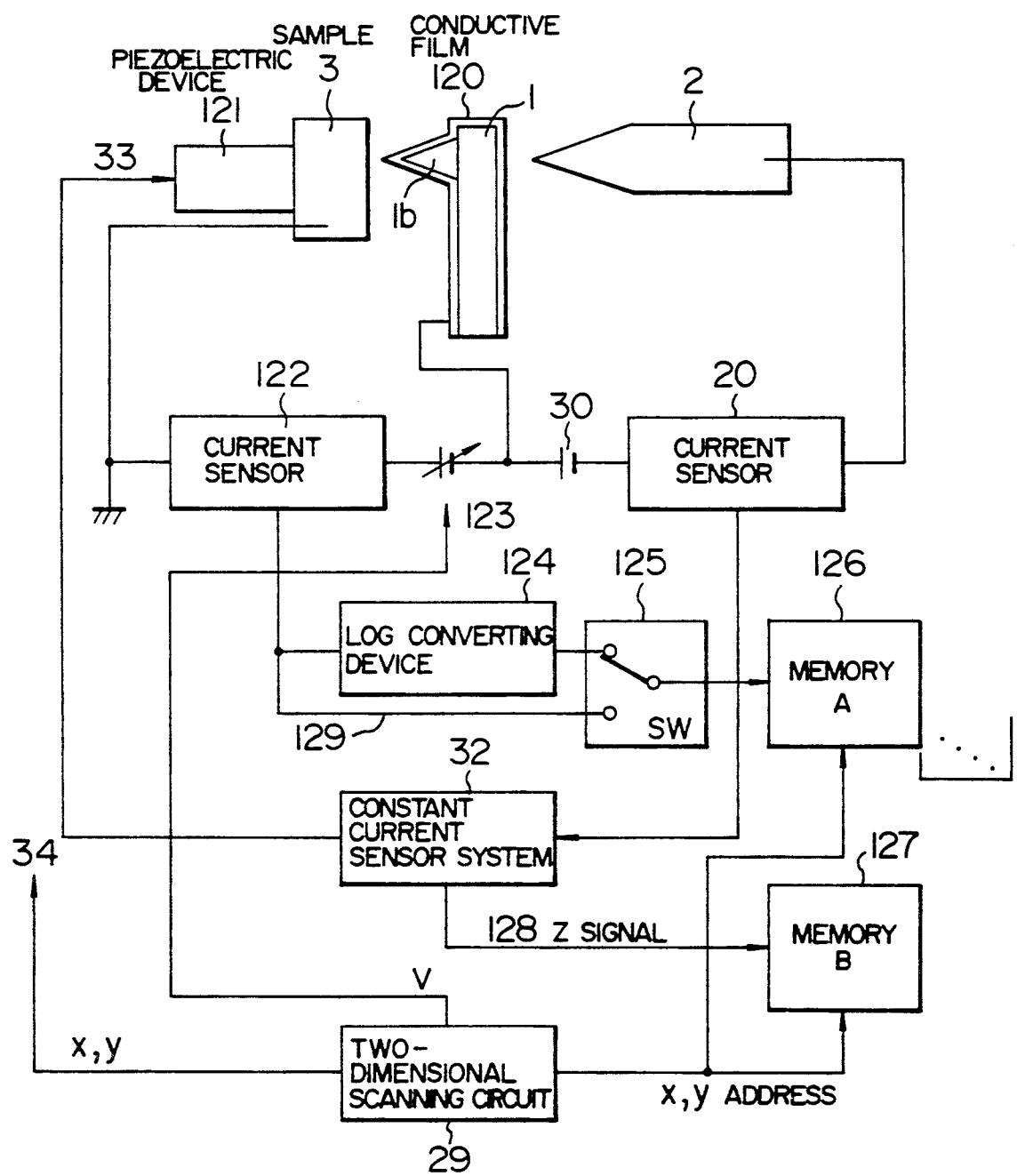
FIG. 13 is a block diagram showing the basic arrangement of the surface microscope according to another embodiment of the invention.

FIG. 13 shows another concrete arrangement of the invention. Under the state shown in FIG. 8D (constant very small force) this arrangement makes it possible to measure the surface topography of the sample as well as a thickness of an insulating film existing on the sample surface and an electron state under the film using the tunneling current flowing between the tip 1b and the sample 1. The arrangement is designed to coat a conductive film 120 on the tip 1b and the cantilever 1, provide an electric power supply 123 between the conductive film 120 and the sample 3, and sense the tunneling current flowing between the tip 1b and the cantilever 1 with a current sensor 122.

To measure how a thickness of the insulating film formed on the surface of the sample 3 is changed, a log converter 124 is used. Further, a sensing channel 129 is also provided for measuring the tunneling current itself. For selecting either one of the log converter 124 and the sensing channel 129, a switch 125 is provided for storing the selected data in a memory A 126. The surface topography of the sample, on the other hand, can be obtained by storing a Z signal 128 sent from a constant current servo system 32 in a memory B 127.

The foregoing mechanisms and control systems make it possible to make a film thickness image relating the surface topography of the insulating film and how a thickness of the insulating film is changed or to measure the surface topography of the film. In case different kinds of atoms exist on the surface, such as in scanning tunneling spectroscopy (STS), it is necessary to take the steps of moving the tip $1b$ or the sample 3 for scanning in the X- and Y-axis direction, temporarily holding the tip or sample at each measuring point, changing a voltage of the electric power supply 123 for measuring change of the tunneling current depending on the change of the voltage, and measuring how electrons are arranged on the surface of the sample.

The method of measuring a thickness of the insulating film may employ an equation ($\sim \Delta I/I$) based on the change of the tunneling current other than the log conversion method. In either case, the present invention has a feature of measuring the thickness of the insulating film based on the change of the tunneling current.

Concretely, it is possible to use an output of the divider 102 shown in FIG. 12. With the means for keeping the very small force constant and for measuring the tunneling current using the tip $1b$, as described above, the surface and interface of the insulating film are measured. An another means, it may be possible to employ heat (temperature), light and sound for measuring the surface and interface of the insulating material in place of using the tunneling current without departing from the spirit of the invention. Further, by radiating a laser beam or a ray to the sample 3, it may be also possible to measure the electronic structure of the sample 3.

If the tip $1b$ of the cantilever 1 is made of a magnetic material, it is possible to measure how magnetization is distributed on the sample 3. Further, by minutely vibrating the cantilever 1 toward the sample, it is possible to sense the change of the tunneling current and measure a variation ($k_1 \Delta IN(I)$) or ($k_2 \Delta I/I$) of the log conversion for sensing a tunneling barrier amount, wherein $k_1$ and $k_2$ are proportional constants. This results in being able to obtain an image of a tunneling barrier and measure the density distribution of impurities contained in a semiconductor. For the measurement, the cantilever is supported by the piezoelectric device and the measurement is permitted by vibrating the piezoelectric device. The STM tip remains held in the measurement.

The aforementioned system is an analog system, but it may be a digital system using a computer. The digital system can offer the same result. Further, the digital system makes it easier to perform the sequence control, thereby making it possible to display the surface topography from various points of views and provide a wide range of utilities. The present invention may employ a computer system without departing from the spirit of the invention. The foregoing embodiment has used the tunneling current, but it may use an electric-field emitting current.

In turn, the description will be directed to tunneling microscopy with reference to FIG. 7. With the switch 27 being switched from atomic force microscopy to tunneling microscopy, the switches 21 and 22 are turned to the side of a feedback circuit I 23 in concert. Then, the circuit 28 supplies a signal to the cantilever moving system 5 for moving backward the cantilever 1 as shown in FIG. 3. The auto-approach circuit 28 serves to activate the coarse moving system 10 so that the tip 2 comes closer to the sample 3. Later, normal scan type tunneling microscopy is carried out for observing the surface of the sample. Concretely, with the switch 27 being switched from tunneling microscopy to atomic force microscopy, the tip 2 is moved backward and then the cantilever 1 is moved to the position shown in FIG. 7. Then, the auto-approach system serves to move the tip 2 against the cantilever 1 until the tip 2 reaches the allowable range of the atomic force microscopy.

The foregoing embodiment makes it possible to easily switch from atomic force microscopy to tunneling microscopy or vice versa simply by moving the cantilever 1 and the tunneling tip 2. Hence, in case a rare structure is observed on the sample surface during the observation of topography, the method of the observation can be easily switched from the atomic force microscopy to the tunneling microscopy for the purpose of checking the electric characteristics of the structure.

As described above, the foregoing embodiment is designed to move the cantilever 1 between the tip 2 and the sample 3 or to move it backward by moving the cantilever 1 in the X-axis direction. For moving the cantilever between the tip 2 and the sample 3, it may be possible to move the cantilever 1 in the Y-axis direction, in any direction in the X-Y plane, or in the direction sloped toward the Z-axis. Further, the foregoing embodiment is designed to remotely operate the expansion or shrinkage of the piezoelectric device or activation of the clamp. The cantilever can be thus remotely-operated for moving it even when it is in vacuum.

Figure 4:
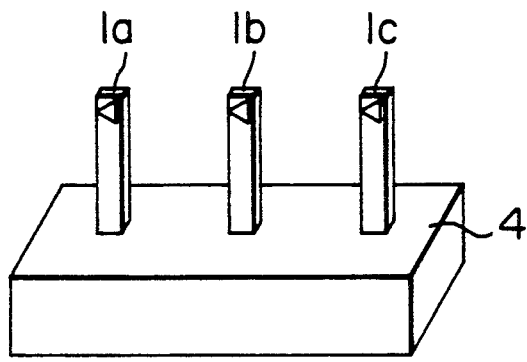
FIG. 4 is a view showing a lever base having three cantilevers mounted thereon.

FIG. 4 shows a lever base having cantilevers mounted thereon. As shown, three cantilevers $1a$, $1b$, $1c$ are mounted on the lever base 4. While observing the sample in a vacuum, for replacing the cantilever, it has been traditionally necessary to break down the vacuum or to use a convey mechanism for conveying the new cantilever into the vacuum. Since this embodiment is designed to mount the cantilevers $1a$, $1b$, $1c$ on the base 4, the foregoing cantilever moving system 5 is capable of easily replace the cantilever. Moreover, it is preferable to arrange the cantilevers mounted on the base 4 to have respective characteristics. For example, the cantilever $1a$ is for atomic force microscopy, the cantilever $1b$ is for magnetic force microscopy, said cantilever $1b$ having a lever tip composed of a magnetic material, and the cantilever $1c$ is for atomic force microscopy, said cantilever $1c$ having a lever tip composed of metal and allowing current to flow between the sample and the lever. The arrangement of the cantilever thus makes it possible to easily measure topography, a magnetic characteristic and an electric characteristic of the sample surface.

Figure 5:
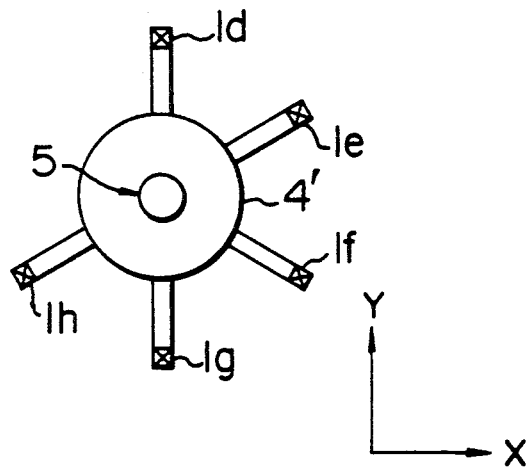
FIG. 5 is a view showing a rotary lever base having five cantilevers mounted thereon.

FIG. 5 shows another embodiment of a lever base having five cantilevers mounted thereon. As shown, the five cantilevers $1d$ to $1h$ are mounted on the lever base $4'$ rotating in the X-Y plane. In case the tunneling tip 2 comes closer to the sample for performing tunneling microscopy, a wide portion located between the cantilevers $1h$ and $1d$ is provided in front of the tunneling tip 2, resulting in allowing the tunneling tip 2 to come closer to the sample without meeting any obstacle. In this embodiment, the rotation of the lever base $4'$ allows the cantilever to move (insert or retreat). The lever base $4'$ thus has a function of the cantilever moving system 5 shown in FIG. 1. That is, the lever base 4' is served as a rotary cantilever moving system 5.

Figure 6:
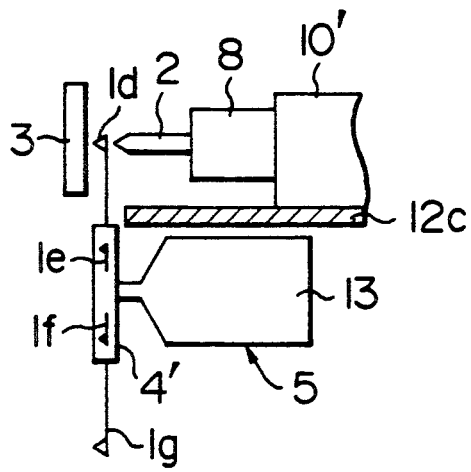
FIG. 6 is a view showing a sensing section including a rotary lever moving system.

FIG. 6 shows an essential portion of a sensing unit including the foregoing rotary cantilever moving mechanism 5 and the tunneling tip 2. The rotary base 4' has the cantilevers 1d to 1h mounted thereon. The rotary base 4' is attached with a highly-accurate motor 13. The rotation of the rotary base 4' allows the cantilevers 1d to 1h to move so that the proper cantilever (for example, 1d) can be located in front of the tunneling tip 2. When the tunneling microscopy is applied, the cantilevers are not permitted to be located in front of the tunneling tip 2, thereby allowing the tunneling tip 2 to come closer to the sample 3 without meeting any obstacle.

FIGS. 1 to 6 shows the essential movement of the cantilever 1 in the X-Y plane. From a practical point of view, it is necessary to provide a Z-axis moving system for moving the cantilever 1 perpendicularly to the X-Y plane. The Z-axis moving system does not require the large movements of the cantilever moving system 5 shown in FIGS. 1 to 6.

According to the invention, it is possible to switch the microscopy from atomic force microscopy or magnetic force microscopy to tunneling microscopy or vice versa without changing the tunneling tip. That is, substantially the same arrangement as for traditional atomic force microscope makes it possible to carry out two or more microscopies. Further, since the invention is designed to move the cantilever, the invention keeps the relative position between the sample and the tunneling tip stable. Hence, two or more pieces of information can be obtained from substantially the same region. Likewise, since the invention perform a function of moving the cantilever backward, it is easy to replace the cantilever as well as the STM tip and the sample.

With the surface-observing means for keeping the very small force stable, it is possible to easily and accurately preset a predetermined very small force value and thus to accurately and stably measure the surface topography and the surface magnetism distribution. When the sample topography is measured, it is also possible to measure a thickness of the insulating film, how atoms are arranged on the interface or electrons are arranged on the material, and the surface topography of the tunneling barrier, thereby making it possible to measure different kinds and densities of elements included on the interface. This results in being able to elucidate impurity contamination on the interface and to observe the impurity density distribution.

What is claimed is:

1. A surface microscope apparatus for analyzing a sample surface, comprising:
    a cantilever whose displacement is caused by an atomic force exerted between a tip of the cantilever and a sample;
    means for detecting the displacement of the cantilever with respect to a sample surface, and for providing data representing said displacement;
    means, employing the cantilever, for scanning a surface of a sample;
    means for forming an atomic force image of a sample surface on the basis of the displacement data provided by the detecting means;
    means for establishing a voltage difference between the cantilever and a sample surface to cause a tunneling current between the cantilever and the sample surface;
    means for providing data representing the tunneling current caused by said voltage difference; and
    means for forming an image of the thickness of an insulating film on said sample, including means for forming said insulating film thickness image on the basis of the tunneling current data.

2. A surface microscope apparatus as claimed in claim 1, wherein said cantilever is coated with metal material.

3. A surface microscope apparatus as claimed in claim 2, wherein the means for forming an image of thickness of an insulating film includes means for converting the tunneling current data into insulating film thickness data, and means for forming said insulating film thickness image on the basis of the insulating film thickness data.

4. A surface microscope apparatus as claimed in claim 3, wherein the converting means includes a log converter.

5. A surface microscope apparatus as claimed in claim 2, wherein the means for forming an image of thickness of an insulating film further includes switching means for selectively enabling the insulating film thickness image to be formed based on the tunneling current data or the insulating film thickness data.

* * * * *